United States Patent
Fjellet

(10) Patent No.: US 12,287,010 B2
(45) Date of Patent: Apr. 29, 2025

(54) HYDRAULIC COUPLING DEVICE

(71) Applicant: AKTIEBOLAGET SKF, Gothenburg (SE)

(72) Inventor: Nicklas Fjellet, Hofors (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/110,616

(22) Filed: Feb. 16, 2023

(65) Prior Publication Data

US 2023/0265892 A1 Aug. 24, 2023

(30) Foreign Application Priority Data

Feb. 24, 2022 (DE) .......................... 102022201911.3

(51) Int. Cl.
 *F16D 1/05* (2006.01)
 *F16D 1/091* (2006.01)
 *F16D 1/09* (2006.01)

(52) U.S. Cl.
 CPC ............... *F16D 1/05* (2013.01); *F16D 1/091* (2013.01); *F16D 2001/0906* (2013.01)

(58) Field of Classification Search
 CPC .. F16L 37/62; F16D 1/05; F16D 1/091; F16D 2001/0906; F16D 1/0805; F16D 2300/08; F15B 21/00; F16J 15/061
 See application file for complete search history.

(56) References Cited

U.S. PATENT DOCUMENTS

| | | | |
|---|---|---|---|
| 3,228,102 A * | 1/1966 | Sillett | F16D 1/095 29/893.2 |
| 4,202,644 A | 5/1980 | Soussloff | |
| 4,425,050 A | 1/1984 | Durand | |
| 4,863,314 A * | 9/1989 | Baugh | F16L 37/62 405/188 |
| 5,337,105 A | 8/1994 | Vaynshteyn | |
| 2023/0265872 A1 | 8/2023 | Fjellet et al. | |

FOREIGN PATENT DOCUMENTS

| | | |
|---|---|---|
| BE | 464952 A | 6/1996 |
| CN | 201963755 U | 9/2011 |
| CN | 202418272 U | 9/2012 |
| CN | 213899650 U | 8/2021 |
| FR | 2509815 A1 | 1/1983 |
| GB | 1276547 A | 6/1972 |

(Continued)

OTHER PUBLICATIONS

Unpublished U.S. Appl. No. 18/110,608.

(Continued)

*Primary Examiner* — Zachary T Dragicevich
*Assistant Examiner* — James A Linford
(74) *Attorney, Agent, or Firm* — J-TEK LAW PLLC; Scott T. Wakeman; Mark A. Ussai

(57) ABSTRACT

A hydraulic coupling device includes an inner sleeve having a tapered outer surface, an outer sleeve having a tapered inner surface mounted on the tapered outer surface of the inner sleeve, a nut screwed onto the inner sleeve and a cylinder formed separately from the outer sleeve and secured to the outer sleeve. At least a portion of the nut extends into the cylinder, and the inner sleeve, the cylinder, the nut and the outer sleeve together delimit a chamber.

19 Claims, 1 Drawing Sheet

(56) References Cited

FOREIGN PATENT DOCUMENTS

| KR | 200198198 Y1 | 10/2000 | | |
|---|---|---|---|---|
| SE | 121560 C1 | 2/1948 | | |
| WO | WO-9500767 A1 | * | 1/1995 | ........... F16D 1/0805 |

OTHER PUBLICATIONS

Preliminary Search Report from the French Patent Office dated Nov. 15, 2023 in related French application No. FR2301303, including Search Report and Written Opinion.
Search Report from the British Patent Office dispatched Jun. 9, 2023 in related application No. GB2300767.7.

* cited by examiner

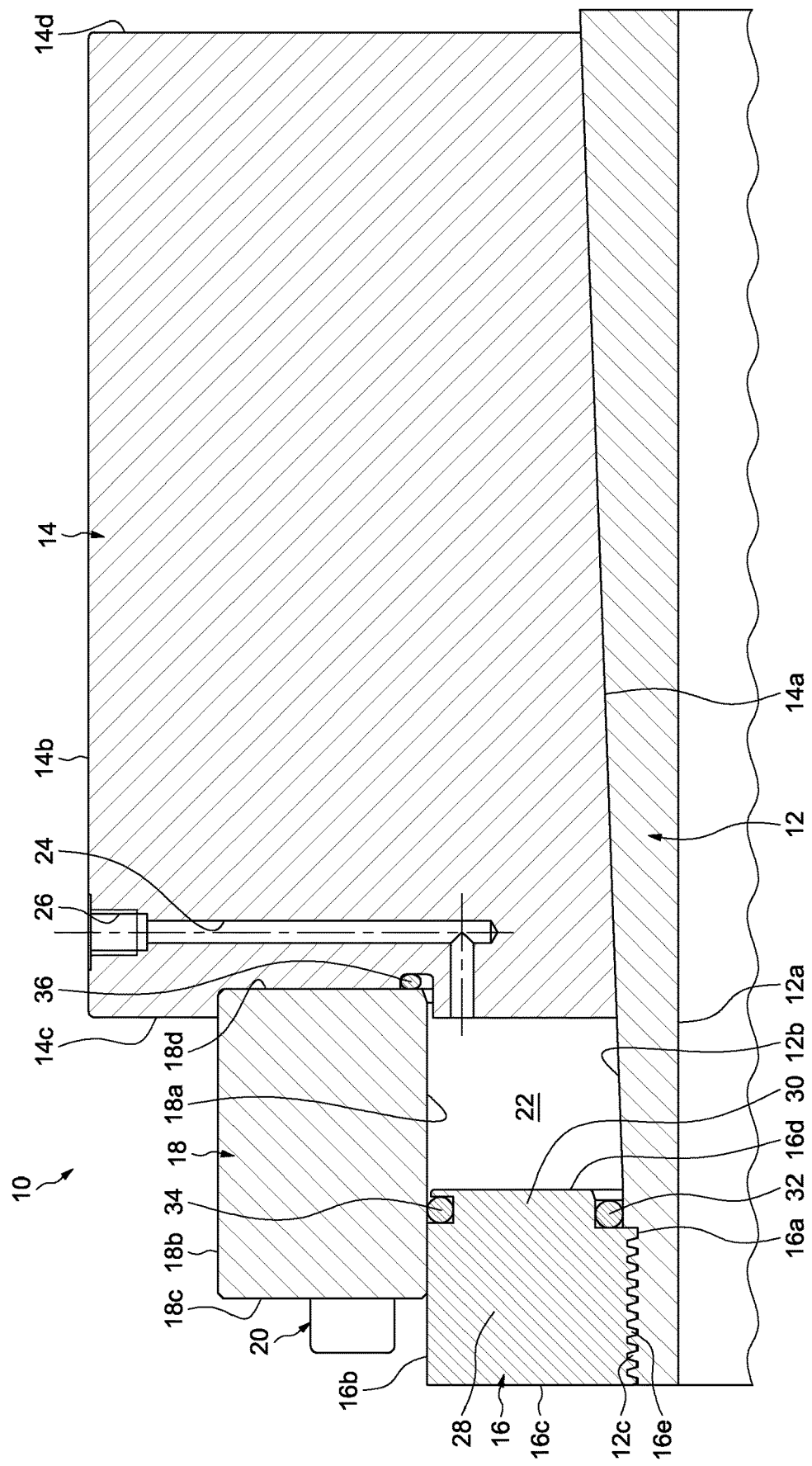

HYDRAULIC COUPLING DEVICE

CROSS-REFERENCE

This application claims priority to German patent application no. 10 2022 201 911.3 filed on Feb. 24, 2022, the contents of which are fully incorporated herein by reference.

TECHNOLOGICAL FIELD

The present disclosure is directed to the field of hydraulic coupling devices, and, more specifically, to hydraulic coupling devices used to create a simple connection between two shafts.

BACKGROUND

Conventionally, a hydraulic coupling device comprises a thin inner sleeve and a thick outer sleeve. The outer surface of the inner sleeve is slightly tapered and the bore of the outer sleeve has a corresponding taper. The inner sleeve bore is somewhat larger than the diameter of the shafts to be connected so that the inner sleeve can be passed over them with ease.

The hydraulic coupling device further comprises a piston or nut screwed on the inner sleeve and delimiting together with the inner and outer sleeves a hydraulic chamber intended to be filed by oil or similar liquid. A seal is proved on the nut to avoid an escape of oil from the chamber between the nut and the inner and outer sleeves.

The coupling device is mounted by driving the outer sleeve up on the taper of the inner sleeve using oil pumped into the hydraulic chamber. This compresses the inner sleeve onto shafts creating an interference fit. When the outer sleeve has reached the correct drive-up position, the injection pressure is released and the oil connection is plugged.

With the drive-up operation, the outer sleeve is radially expanded. This impacts the initial radial clearance between the outer diameter of the nut and the outer sleeve. There is also a risk for the seal provided on the nut to be tilted which could lead to an escape of oil.

SUMMARY

An aspect of the present disclosure is to overcome these drawbacks.

Another aspect of the disclosure is a hydraulic coupling device that comprises an inner sleeve having a tapered outer surface, an outer sleeve having with a tapered inner surface mounted on the tapered outer surface of the inner sleeve, and a nut screwed onto the inner sleeve.

According to a general feature, the device further comprises a cylinder made separately from the outer sleeve and secured thereto, at least part of the nut being extending into the cylinder. The inner sleeve, the cylinder, the nut and the outer sleeve together delimit a chamber.

With such a design, the cylinder is less impacted by the radial expansion of the outer sleeve during the drive-up operation.

Otherwise, this enables to obtain a more compact device in the radial direction since the outer surface of the cylinder may be radially offset inward, or radially flush, with respect to the outer surface of the outer sleeve. Alternatively, it could however be possible for the outer surface of the cylinder to be radially offset outward with respect to the outer surface of the outer sleeve.

With such a design, it is also possible for different materials to be used for the cylinder and the outer sleeve, for example materials having different material properties. Alternatively, the cylinder and the outer sleeve may be formed from the same material but exhibit different mechanical properties. For example, the mechanical properties may vary depending on dimensions and any heat treatment.

In one embodiment, the nut comprises a main portion and a nose having a reduced outer diameter that protrudes axially towards the outer sleeve.

Preferably, the device comprises a first seal radially interposed between the inner sleeve and the nose of the nut, and a second seal radially interposed between the cylinder and the nose.

Alternatively, it could be possible to have a single seal provided on the nut and having an inner edge in contact with the inner sleeve and an outer edge in contact with the cylinder. In this case, the nut may not be provided with the nose. This seal could be secured to a frontal face of the nut axially facing the outer sleeve.

The device may further comprise at least one seal axially provided between the outer sleeve and the cylinder.

The cylinder may axially abut against a frontal face of the outer sleeve. Preferably, the cylinder is in direct axial contact with the outer sleeve.

Advantageously, the chamber is radially defined between the tapered outer surface of the inner sleeve and the bore of the cylinder. The chamber may be axially defined between the nut and the outer sleeve.

Preferably, the outer sleeve, or the cylinder, or the nut, is provided with at least one injection conduit made into its thickness and opening into the chamber.

BRIEF DESCRIPTION OF THE DRAWINGS

The present invention and its advantages will be better understood by studying the detailed description of a specific embodiment given by way of a non-limiting example and illustrated by the appended drawing on which:

FIG. 1 is a partial cross-sectional view of a hydraulic coupling device according to an embodiment of the invention.

DETAILED DESCRIPTION

The hydraulic coupling device 10 illustrated on FIG. 1 comprises an annular inner sleeve 12, an annular outer sleeve 14 mounted on the inner sleeve, and an annular piston or nut 16 screwed onto the inner sleeve.

As will be described hereinafter, the device 10 further includes an annular cylinder 18 formed separately from the outer sleeve 14 and secured thereto.

The inner sleeve 12 comprises a cylindrical inner surface or bore 12a and a tapered outer surface 12b which is radially opposite to the bore 12a. The inner sleeve is also provided at one axial end with an outer thread 12c extending radially outward. In the illustrated example, the outer thread 12c is radially offset inwards with regard to the tapered outer surface 12b.

The outer sleeve 14 comprises a tapered inner surface 14a matching with the tapered outer surface 12b of the inner sleeve and mounted onto this tapered outer surface. The outer sleeve 14 also comprises an outer surface 14b which is radially opposite to the tapered inner surface 14a. The outer sleeve 14 further comprises first and second opposite frontal faces 14c, 14d which axially delimit the tapered inner surface 14a and the outer surface 14b.

As previously mentioned, the cylinder 18 is made separately from the outer sleeve 14. The cylinder 18 radially surrounds the portion of the tapered outer surface 12b of the inner sleeve that is not covered by (left free) the outer sleeve 14. The cylinder 18 also radially surrounds at least part of the nut 16. Alternatively, the cylinder 18 may radially surround the entire nut 16. The cylinder 18 protrudes axially with respect to the frontal face 14c of the outer sleeve. The cylinder 18 is radially offset with respect to the outer surface 14b of the outer sleeve. At least part of the nut 16 extends into the cylinder 18. Alternatively, the nut 16 may be entirely located in the cylinder 18. A slight radial clearance is provided between the nut 16 and the cylinder 18.

The cylinder 18 is mounted axially against the frontal face 14c of the outer sleeve. In the illustrated example, an annular recess (not referenced) is formed on the frontal face 14c inside which is engaged the cylinder 18. Alternatively, the recess may be omitted.

The cylinder 18 is secured to the outer sleeve 14. In the illustrated example, the device 10 comprises a plurality of fixing screws 20 to secure the cylinder 18 to the outer sleeve 14. The screws 20 are spaced apart in the circumferential direction, preferably regularly. The screws 20 extend axially through the cylinder 18. Each screw 20 is engaged inside a threaded hole (not shown) formed from the frontal face 14c of the outer sleeve.

The cylinder 18 comprises a cylindrical inner surface or bore 18a and a cylindrical outer surface 18b which is radially opposite to the bore 18a. The outer surface 18b is radially offset inwards with respect to the outer surface 14b of the outer sleeve.

The cylinder 18 also comprises two opposite first and second frontal faces 18c, 18d which axially delimit the bore 18a and the outer surface 18b. The frontal face 18d axially abuts against the frontal face 14c of the outer sleeve.

The nut 16 also comprises a cylindrical inner surface or bore 16a and a cylindrical outer surface 16b which is radially opposite to the bore 16a. The nut 16 further comprises two opposite first and second frontal faces 16c, 16d which axially delimit the bore 16a and the outer surface 16b.

As previously mentioned, a slight radial clearance is provided between the nut 16 and the cylinder 18. This radial clearance is provided between the outer surface 16b of the nut and the bore 18a of the cylinder. The bore 16a of the nut is provided with an inner thread 16e engaged with the outer thread 12c of the inner sleeve.

The nut 16, the outer sleeve 14, the inner sleeve 12 and the cylinder 18 delimit together an annular hydraulic chamber 22. The chamber 22 is axially delimited by the nut 16 and the outer sleeve 14. More precisely, the chamber 22 is axially delimited by the frontal face 16d of the nut and the frontal face 14c of the outer sleeve. The chamber 22 is radially delimited by the inner sleeve 12 and the cylinder 18. More precisely, the chamber 22 is radially delimited by the bore 18a of the cylinder and the tapered outer surface 12b of the inner sleeve.

The chamber 22 is configured to be filed by oil. To this end, an injection conduit 24 is provided into the thickness of the outer sleeve 14. A first end of the injection conduit 24 opens into the chamber 22. The injection conduit 24 opens onto the frontal face 14c of the outer sleeve. An injection hole 26 is provided on the outer surface 14b of the outer sleeve and is connected to a second end of the injection conduit 24 which is opposite to the first end. Alternatively, the injector 24 and the injection hole 26 may be provided on the nut 16 or on the piston 18.

The outer sleeve 14 is also provided with additional injection conduits (not shown) in order to be able to build up an oil film between the tapered outer and surfaces 12b, 14a of the inner and outer sleeves.

In the illustrated example, the nut 16 comprises a main portion 28 and a nose 30 having a reduced outer diameter that protrudes axially towards the outer sleeve 14. In the illustrated example, the main portion 28 and the nose 30 are made in one part. Alternatively, the nose 30 may be made separately from the main portion 28. The main portion 28 of the nut delimits the bore 16a, the outer surface 16b and the frontal face 16c. The nose 30 delimits the frontal face 16d.

The device 10 further comprises a first annular seal 32 radially interposed between the outer surface 12b of the inner sleeve and the nose 30 of the nut, and a second seal 34 radially interposed between the bore 18a of the cylinder and the nose. The seal 32 radially comes into contact with the nut 30 and the outer surface 12b of the inner sleeve. The seal 32 may come into contact with a cylindrical or tapered portion of the outer surface 12b. The seal 34 radially comes into contact with the nut 30 and the bore 18a of the cylinder. The seals 32, 34 do not protrude with respect to the frontal face 16d of the nut. In the illustrated example, the seals 32, 34 have a circular crosssection. Alternatively, the seals 32, 34 may have other shapes.

The device 10 further comprises an additional seal 36 axially provided between the outer sleeve 14 and the cylinder 18. The seal 36 is axially provided between the frontal face 14c of the outer sleeve and the frontal face 18d of the cylinder.

The seals 32 to 36 are respectively provided to avoid an escape of oil from the chamber 22 between the nut 16 and the inner sleeve 12, the nut and the cylinder 18, and between the cylinder and the outer sleeve 14.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved hydraulic coupling devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A hydraulic coupling device comprising:
an inner sleeve having a tapered outer surface,
an outer sleeve having a tapered inner surface mounted on the tapered outer surface of the inner sleeve,
a nut screwed onto the inner sleeve, and
a cylinder formed separately from the outer sleeve and secured to the outer sleeve,
wherein at least a portion of the nut extends into the cylinder,
wherein the inner sleeve, the cylinder, the nut and the outer sleeve together delimit a chamber, and
wherein a first seal element is located radially between the cylinder and the nut.

2. The device according to claim 1,
wherein an outer surface of the cylinder is radially flush with an outer surface of the outer sleeve, or
wherein the outer surface of the cylinder is located radially inward of the outer surface of the outer sleeve.

3. The device according to claim 1,
wherein the cylinder is formed from a first material and the outer sleeve is formed from a second material different than the first material.

4. The device according to claim 1,
wherein the nut comprises a main portion having a first radial width and a nose having a second radial width less than the first radial width, the nose protruding axially towards the outer sleeve.

5. The device according to claim 4, wherein the first seal element is located radially between the cylinder and the nose and including a second seal element located radially between the inner sleeve and the nose.

6. The device according to claim 5, further comprising at least one seal axially between the outer sleeve and the cylinder.

7. The device according to claim 1,
wherein the chamber is radially delimited by the tapered outer surface of the inner sleeve and a bore of the cylinder.

8. The device according to claim 7, wherein the chamber is axially delimited by the nut and the outer sleeve.

9. The device according to claim 1,
wherein the outer sleeve, the nut or the cylinder includes at least one injection conduit opening into the chamber.

10. The device according to claim 1,
wherein the chamber is axially delimited by the nut and the outer sleeve.

11. The device according to claim 1,
wherein the cylinder contacts the outer sleeve at a joint.

12. The device according to claim 1,
wherein an outer surface of the cylinder is located radially inward of the outer surface of the outer sleeve,
wherein the cylinder is formed from a first material and the outer sleeve is formed from a second material different than the first material,
wherein the nut comprises a main portion having a first radial width and a nose having a second radial width less than the first radial width, the nose protruding axially towards the outer sleeve,
wherein the first seal element is mounted radially between the cylinder and the nose,
wherein a second seal element is mounted radially between the inner sleeve and the nose,
wherein at least one seal is mounted axially between the outer sleeve and the cylinder,
wherein the cylinder abuts against an axial surface of the outer sleeve,
wherein the chamber is radially delimited by the tapered outer surface of the inner sleeve and a bore of the cylinder and axially delimited by the nut and the outer sleeve, and
wherein the outer sleeve, the nut or the cylinder includes at least one injection conduit opening into the chamber.

13. The device according to claim 1,
wherein the outer surface of the cylinder is located radially inward of the outer surface of the outer sleeve.

14. A hydraulic coupling device comprising:
an inner sleeve having a tapered outer surface,
a single unitary outer sleeve having a tapered inner surface mounted on the tapered outer surface of the inner sleeve and having an axial outer surface having an axially facing annular recess,
a nut screwed onto the inner sleeve, and
a cylinder formed separately from the outer sleeve and secured to the outer sleeve,
wherein the annular recess includes a first radial side, a second radial side and an axial bottom,
wherein an axial end of the cylinder axially abuts the axial bottom of the annular recess,
wherein at least a portion of the nut extends into the cylinder, and
wherein the inner sleeve, the cylinder, the nut and the outer sleeve together delimit a chamber.

15. The hydraulic coupling according to claim 14,
wherein a first seal element is located radially between the cylinder and the nut.

16. The hydraulic coupling according to claim 15,
wherein the cylinder is fixed to the outer sleeve by a screw extending through the cylinder.

17. A hydraulic coupling device comprising:
an inner sleeve having a tapered outer surface,
an outer sleeve having a tapered inner surface mounted on the tapered outer surface of the inner sleeve,
a nut screwed onto the inner sleeve, and
a cylinder formed separately from the outer sleeve and secured to the outer sleeve,
wherein at least a portion of the nut extends into the cylinder,
wherein a surface of the inner sleeve, a surface of the cylinder, a surface of the outer sleeve and a first surface of the nut together delimit a chamber,
wherein a second surface of the nut engages the inner sleeve, a third surface of the nut faces the cylinder and a fourth surface of the nut is located outside the chamber, and
wherein a first seal element is located radially between the cylinder and the nut.

18. The hydraulic coupling according to claim 17,
wherein the cylinder is fixed to the outer sleeve by a screw extending through the cylinder.

19. The hydraulic coupling according to claim 17,
wherein the first surface of the nut is an axial surface and the surface of the outer sleeve is an axial surface facing the first surface of the nut, and
wherein the surface of the cylinder is a radial surface facing the surface of the inner sleeve.

* * * * *